April 16, 1935.  G. G. LOWRY  1,998,374
DENTAL SPECULUM
Filed Nov. 10, 1933  2 Sheets-Sheet 1
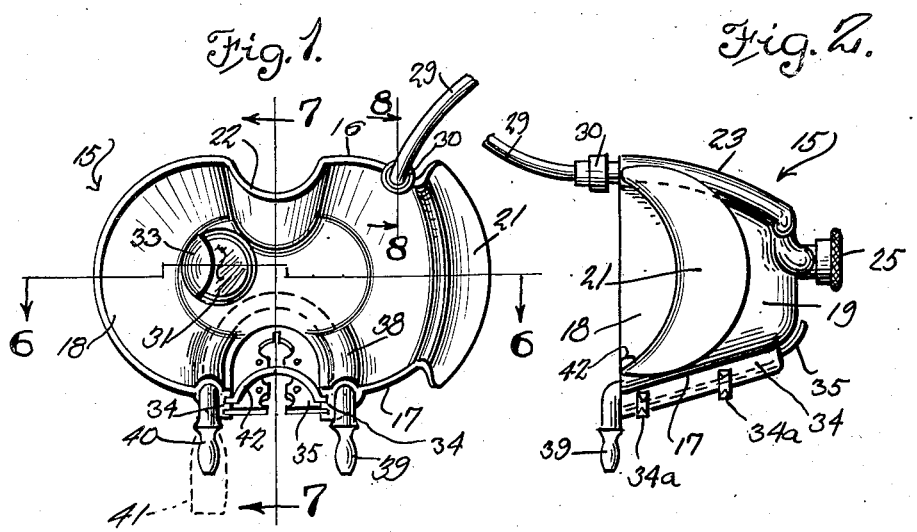
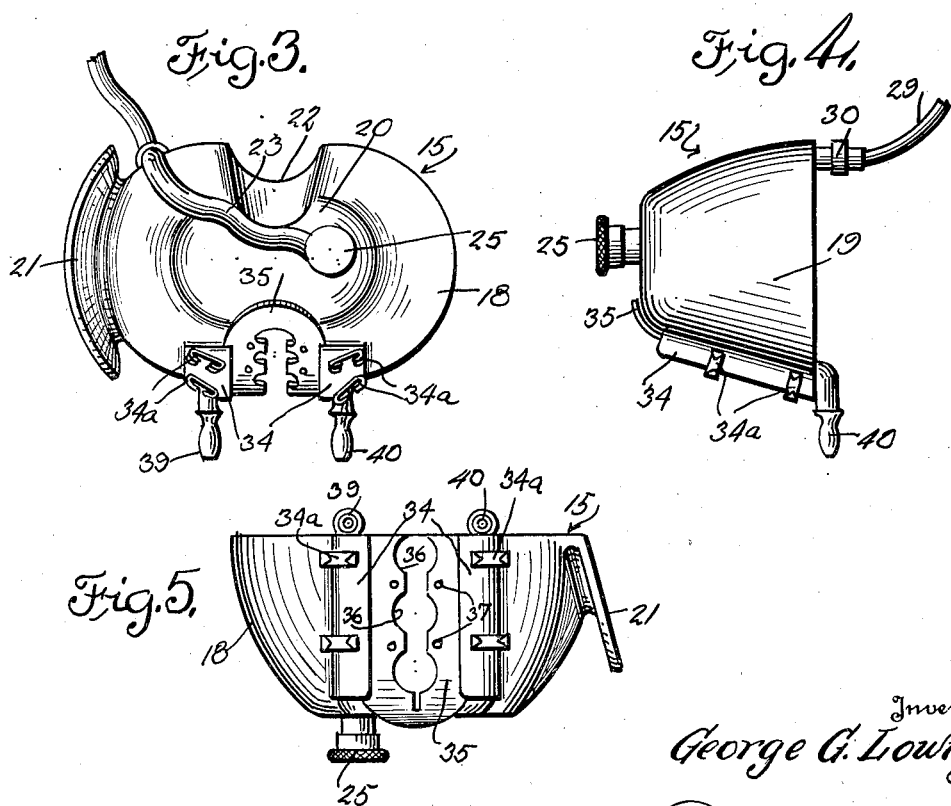
Inventor
George G. Lowry.

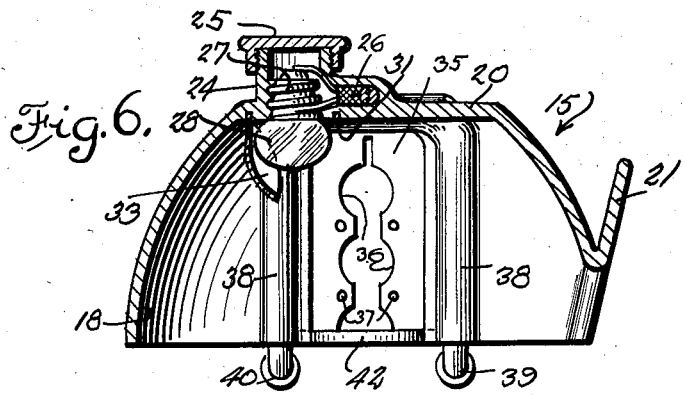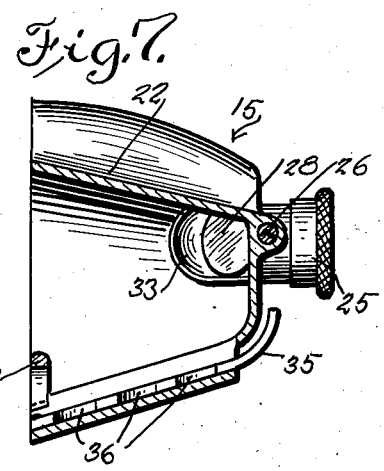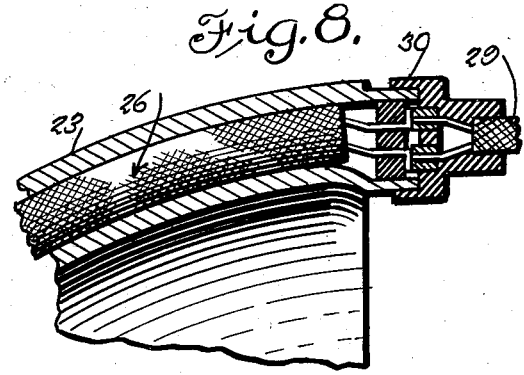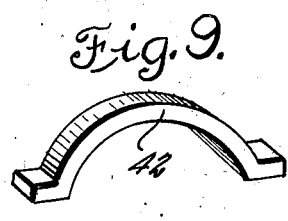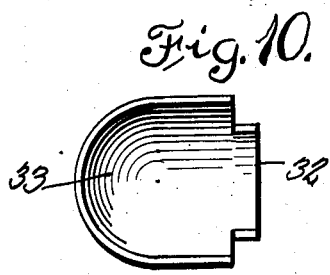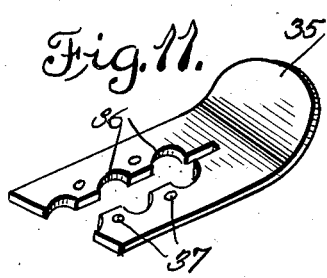

Patented Apr. 16, 1935

1,998,374

UNITED STATES PATENT OFFICE 1,998,374

DENTAL SPECULUM

George G. Lowry, Pittsburgh, Pa., assignor of one-half to Samuel Lowry Henry, Pittsburgh, Pa.

Application November 10, 1933, Serial No. 697,514

6 Claims. (Cl. 128—10)

This invention relates to certain new and useful improvements in dental speculums.

The primary object of the invention is to provide a dental speculum of receptacle or cup form with a flange upon one side to be positioned exteriorly of the cheek when the speculum is placed within the mouth of a person to act as a cheek compressor and for maintaining the mouth of a person in an open condition in a convenient manner and in the absence of irritating or uncomfortable feelings or effects.

A further object of the invention is to provide a dental speculum having a portion of a side wall thereof removed for the detachable reception of a tooth clamp for maintaining the speculum in position within the mouth of a person.

It is a further object of the invention to provide a dental speculum of the foregoing character with illuminating means arranged interiorly thereof and further embodying a saliva ejector permanently carried thereby whereby both hands of a dentist are free for dental work and eliminating the use of a mouth mirror and the ordinary manipulation of a saliva ejector.

A further and important object of the invention is to provide a dental speculum wherein the conductor from a source of potential to the illuminating means within the speculum is detachable therefrom to permit complete sterilization of the speculum in a steam or other bath.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of a dental speculum constructed in accordance with the present invention, showing the internally positioned illuminating means and saliva ejector permanently carried by the speculum;

Figure 2 is an end elevational view of the speculum showing the cheek compressor flange carried thereby;

Figure 3 is a rear elevational view;

Figure 4 is another end elevational view;

Figure 5 is a bottom plan view showing the guide flanges for the removable reception of the tooth clamp;

Figure 6 is a cross-sectional view taken on line 6—6 of Figure 1, showing the adjustably mounted reflector for the lamp bulb;

Figure 7 is a vertical cross-sectional view taken on line 7—7 of Figure 1;

Figure 8 is an enlarged detail sectional view taken on line 8—8 of Figure 1, showing the detachable connection between the electric conductor and the speculum;

Figure 9 is a perspective view of a brace bar bridging the side walls of an opening in the speculum;

Figure 10 is a plan view of the adjustable reflector; and

Figure 11 is a perspective view of the tooth clamp.

Briefly described, the dental speculum is constructed of metal treated, coated or polished to a mirror finish which eliminates the use of the ordinary hand mirror usually employed by dentists. The usual extraneous illuminating means employed by dentists is eliminated by the presence of a lamp within the speculum that includes an adjustable reflector that may be conveniently positioned for directing rays of light directly into that part of the mouth or upon certain teeth upon which the dentist is working. The question of saliva ejection during dental work is a serious one both to the dentist and patient and these objections are eliminated by the permanent attachment of a saliva ejector to the speculum.

Referring more in detail to the accompanying drawings, there is illustrated a dental speculum designated in general by the reference character 15 of cup-formation having upper and lower side walls 16 and 17 respectively, end walls 18 and 19 respectively and a bottom or rear wall 20, the several walls being formed on suitable curves for the convenient support of the speculum within the mouth of a person. A rearwardly directed flange 21 is carried by the end wall 19, constituting a cheek compressor when the speculum is within the mouth of a person. It is to be understood that the cheek compressor flange 21 may be positioned on either end of the speculum so that the device may be constructed for insertion in either side of the mouth. A depression 22 is formed in the upper side 16 to provide a clearance or restful pocket for the reception of the posterior teeth of the upper case or upper mandible.

Illuminating means is permanently located within the speculum and includes a conduit 23 forming an integral part of walls of the speculum, projecting outwardly of the walls as illustrated in several of the figures, one end of the conduit 23 being in communication with a lamp socket 24 in the form of a tubular boss carried by the bottom or rear wall 20 of the speculum adjacent the end wall 18 that is closed by a screw cap 25. The other end of the conduit 23 terminates adjacent the end wall 19. An electric conductor 26 is permanently located within the conduit 23 with the wires at one end thereof in communication with the lamp base 27 of the lamp bulb 28 that is seated in the tubular socket 24 as shown in Figures 6 and 8. The wires at the other end of the conductor 26 are placed in communication with a conductor 29 extending from a source of potential by means of a connector 30. It will be understood that the connector 30 is readily detachable from the conduit 23 as shown in Figure 8, while the conductor 26 remains a permanent part of the speculum. An annular groove 31 is formed in the bottom or rear wall 20 of the speculum concentric with the lamp socket 24 and receives the end extension 32 upon the lamp reflector 33 that is of a curvature as clearly illustrated in Figs. 1, 6 and 10, the reflector 33 is circumferentially adjustable with respect to the lamp bulb 28 for directing the rays of light onto a particular part of the mouth or tooth and said reflector is bowl shaped or arched to partly overlie the end of the lamp bulb to prevent direct glare of the lamp from passing to the eyes of the dentist.

To effectively retain the speculum within the mouth of a person, against movement, the speculum is constructed for removable attachment of a tooth clamp, the lower side 17 of the cup-shaped speculum being cut away and providing substantially parallel side walls bordering the cut-away opening that carry channel guides 34 for the detachable reception and support of a tooth clamping plate 35. The clamping plate is of ordinary construction and may be provided with one or more mating depressions 36 in opposite sides thereof for selective clamping engagement with a tooth or teeth. The clamping plate selected is determined by attachment to a tooth independently of the speculum and is then attached to the speculum when the device is inserted in the mouth of a person, a clamp forcep is engaged with the opening 37 in opposite side portions of the clamping plate for expansion of the clamp during placement thereof on a tooth, the inherent flexible and resilient characteristic thereof effecting contraction about a tooth. The tooth clamp is readily detachable from the speculum to permit the substitution of a clamp of another design whenever desired.

To eliminate the presence of saliva in the mouth of a person during dental operations and the like, it is customary to place absorbent pads in the mouth and also a saliva ejector tube that is suspended upon the lower lip of the mouth, this ejector tube being uncomfortable in use and in many instances interfering with the work of a dentist. The present invention embodies a saliva ejector that forms a permanent part of the speculum and is in the form of a conduit 38 of substantially U-shape that surrounds the cut-away portion receiving the tooth clamp, the ends of the conduit 38 projecting outwardly of the lower side 17 and respectively provided with nipples 39 and 40. The nipple 39 is positioned exteriorly of the mouth when the speculum is disposed within the mouth and receives a rubber tube or the like forming communication with suction apparatus while the nipple 40 is positioned within the mouth and may carry a relatively short rubber tube 41 illustrated by dotted lines in Figure 1 to engage the bottom of the mouth for the effective ejection of saliva.

The side wall of the cut-away portion of the lower side 17 of the speculum may be braced by the arched bar 42 shown in detail in Figure 9 that is removably engaged with the lower side 17 of the speculum as illustrated in Figures 1 and 6, but should it be determined that this brace bar offers an obstruction to the work of the dentist, the same may be removed.

It will be observed that several elements are cooperatively associated in a single combined structure so that the hands of the dentist are free for dental work alone, the speculum providing a restful support when placed within the mouth of a person without undue stretching of the cheeks and lips, the use of a hand mirror being eliminated by the mirror finish on the device while the illuminating means includes the reflector that is adjustable for directing light rays on that part of the mouth upon which the dentist is working. Complete ejection of saliva is effected without the inconvenience of the usual lip supported hanging ejector and in addition, spurs or pins 34a depend from the guide channels 34 for the support of cylindrical or other absorbent pads. The conductor 29 is detachable from the speculum to permit the latter to be bodily immersed in sterilizing solution for cleansing purposes. The speculum is preferably constructed of a metal light in weight to add to the comfort of a person upon whom the same is being used.

From the above detailed description of the device, it is believed that the construction and use thereof will at once be apparent, it being noted that the speculum provides a guard or shield that only exposes the teeth being worked upon so that the patient's mouth is completely protected from contact with dental instruments and the like and injury of the mouth tissues is eliminated. While there is herein shown and described the preferred embodiment of the invention, it is nevertheless to be understood that minor changes may be made therein without departing from the spirit and scope of the invention as claimed.

I claim:—

1. In a device of the character described, a speculum, tooth anchor means detachably engaged therewith, a saliva ejector forming a permanent part of the speculum and illuminating means within the speculum, said speculum being of cup-formation, and a flange at one end of the speculum cooperating with the adjacent end wall of the speculum to form a cheek compressor, the saliva ejector including a tube of substantially U-shape with a nipple at each end projecting outwardly of the speculum for selective association with suction producing means.

2. In a device of the character described, a speculum, tooth anchor means detachably engaged therewith, a saliva ejector forming a permanent part of the speculum, illuminating means within the speculum, the illuminating means comprising a conduit forming a permanent part of the speculum, a lamp socket in the bottom wall of the speculum, a lamp in the socket, a conductor in the conduit in communication with the lamp, said bottom wall having an annular groove concentric with the socket and a reflector shiftably mounted in the groove and overlying a portion of the outer end of the lamp.

3. In a device of the character described, a speculum, tooth anchor means detachably engaged therewith, a saliva ejector forming a permanent part of the speculum and illuminating means within the speculum, said speculum being of cup-formation, a cheek compressor flange at one end of the speculum, the illuminating means comprising a conduit forming a permanent part of the speculum, a lamp socket in the bottom wall of the speculum, a lamp in the socket, a conductor in the conduit in communication with the lamp, said bottom wall having an annular groove concentric with the socket and a reflector shiftably mounted in the groove and overlying a portion of the outer end of the lamp.

4. The combination with a speculum of substantially cup-shape, of tooth anchor means comprising the formation of an opening in a side wall of the speculum, a channel guide at each side of the opening and a tooth clamping plate removably mounted in the channel guides.

5. The combination with a speculum of substantially cup-shape, of tooth anchor means comprising the formation of an opening in a side wall of the speculum, a channel guide at each side of the opening and a tooth clamping plate removably mounted in the channel guides, and absorbent roll supporting pins carried by the channel guides.

6. The combination with a speculum of substantially cup-shape, of illuminating means including a conduit forming a permanent part of the speculum, a lamp socket in the speculum with which the conduit communicates, an electric conductor in the conduit having the wires at one end extending into the socket, a lamp in the socket having electrical connection with the wires, a reflector rotatably adjustable relative to the lamp and a source of energy conductor detachably connected to the other end of the conduit in communication with the conductor therein.

GEORGE G. LOWRY.